(12) United States Patent
Itta et al.

(10) Patent No.: US 12,158,821 B2
(45) Date of Patent: Dec. 3, 2024

(54) SNAPPABLE RECOVERY CHAIN OVER GENERIC MANAGED VOLUME

(71) Applicant: Rubrik, Inc., Palo Alto, CA (US)

(72) Inventors: Vishnu Vardhan Itta, Bengaluru (IN); Vaibhav Bhagee, New Delhi (IN)

(73) Assignee: Rubrik, Inc., Palo Alto, CA (US)

( * ) Notice: Subject to any disclaimer, the term of this patent is extended or adjusted under 35 U.S.C. 154(b) by 93 days.

(21) Appl. No.: 17/986,676

(22) Filed: Nov. 14, 2022

(65) Prior Publication Data

US 2024/0160534 A1   May 16, 2024

(51) Int. Cl.
  *G06F 11/00* (2006.01)
  *G06F 11/14* (2006.01)

(52) U.S. Cl.
  CPC ...... *G06F 11/1469* (2013.01); *G06F 11/1451* (2013.01); *G06F 11/1464* (2013.01); *G06F 2201/84* (2013.01)

(58) Field of Classification Search
  CPC ............. G06F 11/1451; G06F 11/1464; G06F 11/1469
  See application file for complete search history.

(56) References Cited

U.S. PATENT DOCUMENTS

| | | | |
|---|---|---|---|
| 7,287,045 B2* | 10/2007 | Saika | G06F 11/1451 707/999.203 |
| 10,754,731 B1* | 8/2020 | Arumugam | G06F 11/1461 |
| 11,934,273 B1* | 3/2024 | Anwar | G06F 11/1448 |
| 2014/0136803 A1* | 5/2014 | Qin | G06F 3/0683 711/162 |
| 2015/0293817 A1* | 10/2015 | Subramanian | G06F 16/184 707/645 |
| 2018/0285202 A1* | 10/2018 | Bhagi | G06F 11/1469 |
| 2021/0240582 A1* | 8/2021 | Khandkar | G06F 11/1469 |
| 2023/0205636 A1* | 6/2023 | Yadav | G06F 11/1448 707/640 |
| 2023/0205639 A1* | 6/2023 | Yadav | G06F 11/1446 707/645 |

\* cited by examiner

*Primary Examiner* — Joshua P Lottich

(74) *Attorney, Agent, or Firm* — Holland & Hart LLP

(57) ABSTRACT

A data management system (DMS) may perform techniques for snapshotting a host environment data store using a resource volume. The DMS may transmit, to the host environment a first request for a full backup of a data store of the host environment, where the first request results in mounting of a resource volume in an empty state. The DMS may generate a snapshot of the resource volume after completion of the backup at the host. The DMS may transmit one or more second requests for incremental backups, where the second requests result in mounting of the volume in a state corresponding to a previous backup of the host. The DMS may generate a second snapshot of the resource volume. For a subsequent full backup, the DMS may cause mounting of the volume in the empty state to the host rather than mounting the resource volume corresponding to a prior snapshot.

20 Claims, 11 Drawing Sheets

SNAPPABLE RECOVERY CHAIN OVER GENERIC MANAGED VOLUME

FIELD OF TECHNOLOGY

The present disclosure relates generally to database systems and data processing, and more specifically to snappable recovery chain over generic managed volume.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
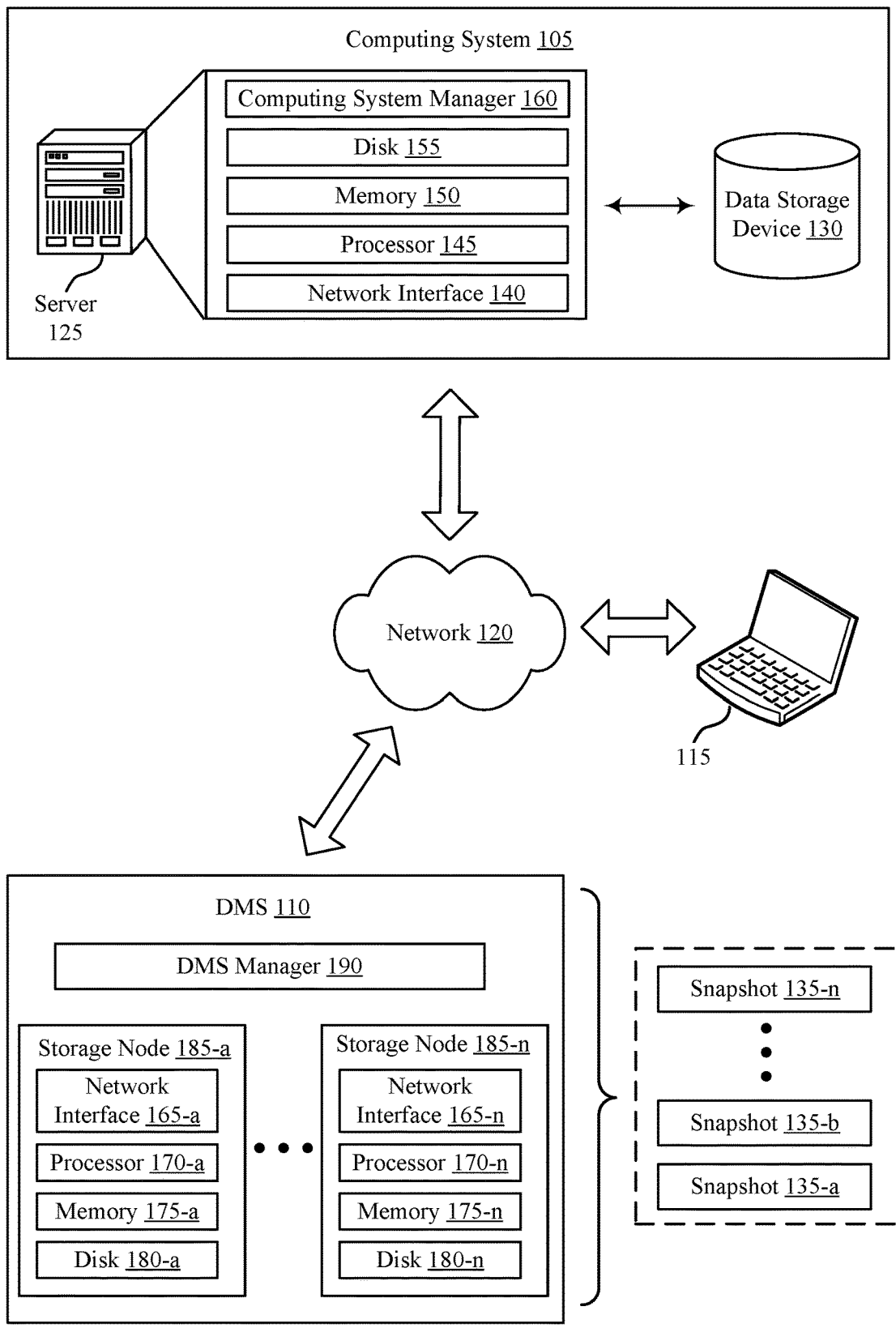
FIG. 1 illustrates an example of a data management system that supports snappable recovery chain over generic managed volume in accordance with aspects of the present disclosure.

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. The DMS may employ data snapshots to support data management and backup. For example, the DMS may cause generation of a snapshot of a host environment, and the snapshot may be stored or managed by the DMS. Subsequently, the snapshot may be used to restore the host environment.

Snapshots may be used for backing up certain types of data storage environments or storage systems, meaning that the storage systems may execute an agent that generates the snapshots for backup. To backup other types of data storage systems, which may be referred to as managed volumes (e.g., unstructured data), a storage mount point is exposed to the managed volume, where data backups (e.g., full and incremental backups) are written. The data backups may then be snapshotted, and the snapshots may be managed similar to other workloads. For each subsequent data backup, the storage volume corresponding to a set of previous snapshots is mounted. However, this technique may result in the host environment (e.g., the data being backed up) performing cleanup of stale files. Additionally, the mounting technique may be performed according to custom retention period at the host environment to limit the size of the mounted volume. Additionally, this technique may result in increased input/output (I/O) loads at the backup system, as the amount of data stored at the managed volume results in longer reverse or consolidate operations in generating and maintaining snapshots.

Techniques described herein support full, differential, and incremental configurations for backups (e.g., including different scripts for each type of backup) for managed volumes. For a full backup (e.g., a period configured according to a service level agreement), an empty volume is exposed to (e.g., mounted to) the host environment for writing the backup data. Each subsequent differential or incremental backup is dependent on the full backup to the mounted volume. As such, a new "chain" of backups is generated for each full backup. This technique may limit the need for the host environment to perform mount cleanup for each full backup, and limit the amount of cleanup for incremental or differential backups. This technique also reduces I/O for consolidation and related procedures on the backup system. These and other techniques are described in further detail with respect to the figures.

Aspects of the disclosure are initially described in the context of an environment supporting data management. Aspects of the disclosure are further described in the context of an environment supporting data backup using a resource volume, a backup chain, and a process flow. Aspects of the disclosure are further illustrated by and described with reference to apparatus diagrams, system diagrams, and flowcharts that relate to snappable recovery chain over generic managed volume.

FIG. 1 illustrates an example of a computing environment 100 that supports snappable recovery chain over generic managed volume in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

As described herein the DMS 110 may function as a backup system for a host data store of the host environment, such as the data storage device 130 of computing system 105. In some cases, the computing system 105 (e.g., the server 125) may execute a backup agent or backup connector to allow the DMS 110 to retrieve snapshots or backups of the data storage device 130. In other cases, a managed volume solution is used to perform backup of a host environment, such as when the data storage device includes unstructured data or various types of databases.

Compared to storage solutions where a device may perform a backup of the data or database then restore the data or database to a backup by reading from the storage, managed volumes may expose a storage mount point that is snapshottable, and the snapshot may be managed similar to other workloads. In some examples, these managed volumes are integrated with service level agreement (SLA) functionality to improve flexibility and reliability. However, the use of exposed storage mount points may result in the in the host computing environment performing clean-up of stale file entries, as the control path is not aware of occurrences on the storage mount. Additionally, various techniques may be used to maintain the size of the managed volume, which may result in the backup system maintaining backups for large amounts of stale data. Further, these techniques may increase frequent deletions of older backups on the managed volume mounts, which may increase the I/O load related to deletion operations and reverse/consolidate operations.

Techniques described herein address these issues by allowing the DMS 110 to cause execution of operation specific scripts at the host environment, such as computing system 105. Further, for each full backup of the host data of the host environment, the DMS 110 may mount an empty volume. For subsequent incremental or differential backups, the volume in a state corresponding to the previous backup is mounted for performing the backup. This techniques may result in a chain of backups starting with a full backup, and based on the service level agreement, the DMS 110 may generate a set of chains, each starting with a full backup that uses an empty mount. This technique may result in fewer cleanup operations at the computing system 105 and reduced processing load for reverse/consolidate operations at the DMS 110, thereby improving the overall computing efficiency in the computing environment 100.

It should be appreciated by a person skilled in the art that one or more aspects of the disclosure may be implemented in computing environment to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
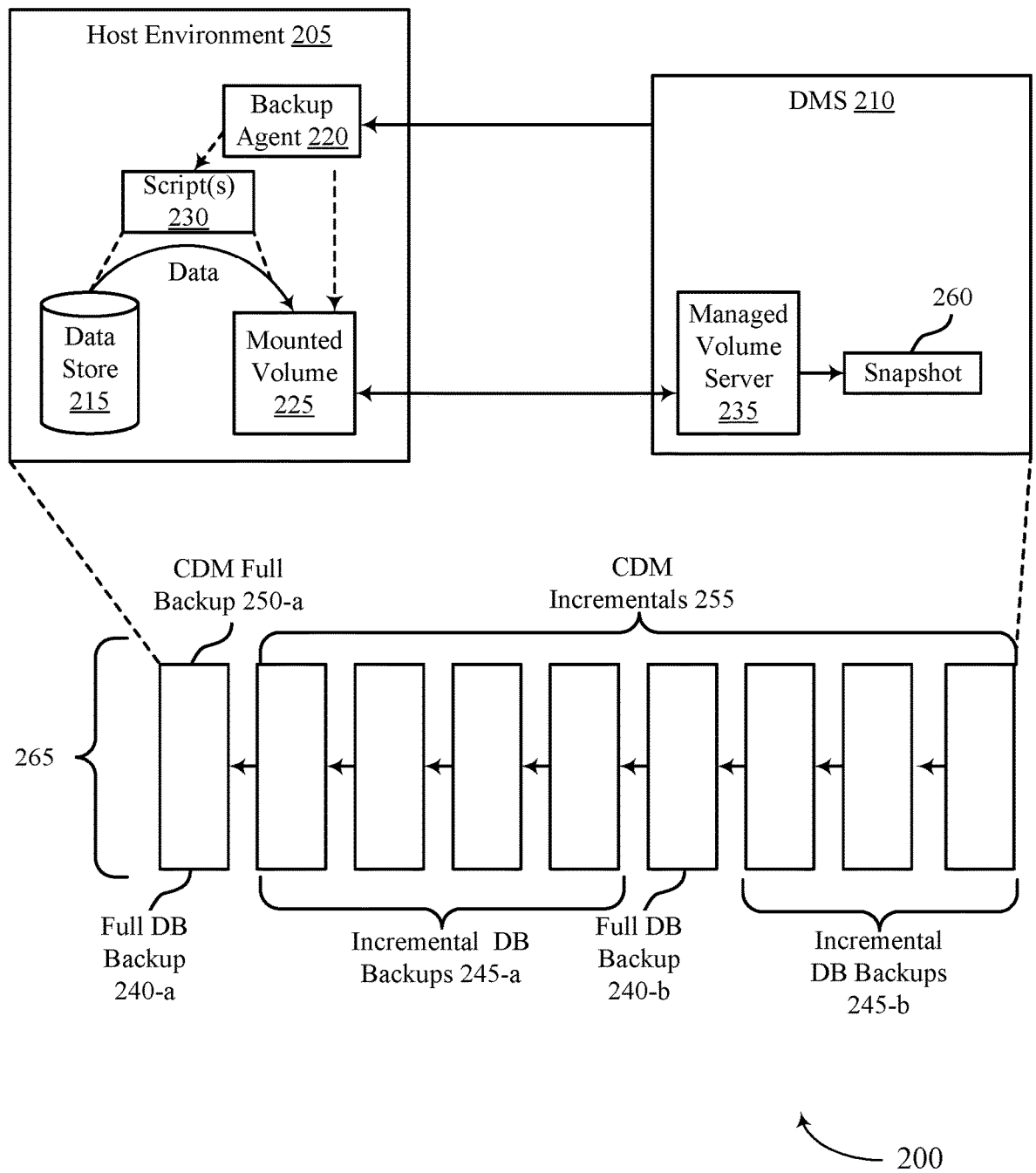
FIG. 2 illustrates an example of a computing environment that supports snappable recovery chain over generic managed volume in accordance with aspects of the present disclosure.

FIG. 2 illustrates an example of a computing environment 200 that supports snappable recovery chain over generic managed volume in accordance with aspects of the present disclosure. The computing environment 200 includes a host environment 205 and a DMS 210. The host environment 205 may be an example of a computing system 105 of FIG. 1, and the DMS 210 may be an example of a DMS 110 of FIG. 1. The host environment 205 may be an example of a host computing environment that supports an organization in data management, application execution, etc. For example, the host environment 205 may execute a set of virtual machines that support various applications, such as a web application, a database server, and/or an application server. The host environment 205 may also support access to a data store 215 that may store, manage, and provide access to organization data. In some examples, the data store 215 stores unstructured data, or is a type of database that is not directly snapshottable, as described herein.

The DMS 210 may be used to support data management, backup, retention, and recovery procedures for one or more host computing environments, such as the host environment 205, as described herein. Further, as the data store 215 of the host environment 205 may not be directly snapshottable, the DMS 210 may implement a managed volume technique to perform backup procedures for the host environment 205. For example, the DMS 210 may call a backup agent 220 such as to cause a resource volume client to be mounted on the host environment 205 as mounted volume 225. For example, the mounted volume 225 may be exposed to the host environment 205 as a client path, such as " . . . /mountclient/path." The DMS 210 may also cause the backup agent 220 to execute a script 230 that causes data to be written from the data store 215 to the mounted volume 225. When the data is written, the DMS 210 may generate a snapshot 260 of the data of the mounted volume 225 via a managed volume server 235, which may be associated with a path such as "ip:Path . . . ." The managed volume server 235 may be a network file system (NFS) share server, or a facility of another type of file sharing protocol. The snapshot 260 may then be stored, managed, and used for recovery, as described herein.

While the managed solution does have snapshotting and service level agreement (SLA) control, the mount may be exposed as a traditional storage mount, meaning that the control path is not aware of what happens on the mount. For instance, the onus of cleaning up stale file entries corresponding to backups that may have been expired by the DMS 210 SLA or out of retention period, may reside with the script 230 executed at the host environment 205. This storage mount based approach may introduce two different competing concepts related to retention: the DMS 210 side retention based on SLA domain and the actual retention of data. In some examples, to limit the size of the managed volume, the configuration of backups may be performed in a manner such that the files get cleaned up from the managed volume mount quicker than the retention period, and the DMS 210 SLA retention still retains the older snapshots where a particular backup file may be present to aid in restoring to a point in time at a later stage. For instance, if the overall retention is required for four weeks and that causes the managed volume logical size to be relatively high, the managed volume may be configured to have a week's worth of files on the mount. Further, DMS 210 SLA retains snapshots in a way that on the whole, four weeks' worth of data is retained. This technique may also increase the need for frequent deletions of older backups to occur on the managed volume mounts, causing an increased I/O load related to the deletion related operations and related to the subsequent reverse/consolidate related operations. Currently, the managed volume solution provides a solution based on a "forever incremental" backup technique.

At 265, a backup chain for a managed volume is illustrated for multiple types of SLAs. As illustrated, the host environment 205 may perform a full database backup 240-a, whereby the data of the data store 215 is written to the mounted volume 225. The DMS 210 performs a full backup 250-a (e.g., generates a first snapshot for the full backup) when the data of the data store 215 is written to the mounted volume 225. Thereafter, the host environment 205 may perform incremental database backups 245-a before a second full database backup 240-b. However, the DMS 210 continuously performs incremental backups 255 after the full backup 250-a, which may result in lengthy backup chains and increased I/O operations. The DMS 210 performs the continuous incremental backups 255 because the DMS 210 may not have access to procedures being performed by the host environment 205.

Further, along with the above force-fit of this solution and to handle stale files or any loss of data during backup failures, customers store more data on the managed volume rather than data related to just one full backup, which may result in higher managed volume size. This leads to longer patch fill conversion (PFC), reverse, and/or consolidate operations, which in-turn ends up in heavy consumption of disk I/Os. That is, because the managed volume is large, the DMS 210 may perform reverse and consolidate operations for a set of snapshots corresponding to the large managed volume, which increases I/O operations at the DMS 210. For example, if the SLA says that the DMS 210 should store one snapshot per day, but the DMS 210 generates four snapshots in a particular day, then the DMS 210 consolidates the snapshots into one snapshot. If the managed volume is large, the consolidate operation may be compute heavy. Additionally, log backups for databases are, in some cases, push based (e.g., the log files automatically get archived to the backup based on at least some invariants related to the size of the log file being true) and in such cases, the control of when a log file could get archived does not reside with the DMS 210. Managed volumes today may not be able to support this use case through ways other than on-demand snapshots, and on-demand snapshots may run into issues while scaling. Additionally, managed volume SLA may not cater well to a log backup scenario and may not support multiple backup schedules on a single managed volume to cater to logs as well. Since the managed volume control path is opaque to what exists on the mount, the restore capability that the DMS 210 provides may also limited to just exposing the snapshot as a mount and letting the host do the restore heavy lifting by understanding the content which is part of the snapshot. The managed volume solution uses a single script that encapsulates the entire backup functionality. That means the managed volume solution of the DMS 210 may not be aware of different types of backups that can be supported by databases such as full backups, differential backups, incremental backups, and log backups, causing the script writer to still do some heavy lifting related to identifying when to perform within the script itself.

Techniques described herein address the forgoing by supporting control path of the managed volume that is aware of the different types of backups. For example, the SLA of the managed volume supports full, differential, and incremental related configurations for the data backups, and the job schedule at the DMS 210 may schedule backups per these configured backups. For each full backup, the DMS 210 exposes the managed volume in an empty state since a full backup may not be dependent on the previous content of the mount. Further, each full backup may mark a new "chain" of backups, which may eliminate or limit the host environment 205 performing mount cleanup for each full backup. For every differential or incremental snapshot, the managed volume corresponding to the chain of backups that the snapshot would depend on is exposed in the mount. For differential backups, for example, a resource volume corresponding to the previous full backup is exposed. For incremental backups, the resource volume corresponding to the chain of backups from the most recent full up to the most recent incremental snapshot is exposed. Further, according to techniques described herein, the resource volume supports configuring separate scripts or commands for full, differential, and/or incremental backups.

As such, according to techniques described herein, the scripts 230 include separate scripts for full, differential, and incremental backups, if such backups are configured for the resource volume. As such, the DMS 210 may call the backup agent 220 to request the corresponding script for execution in accordance with a backup schedule (e.g., a SLA). Thus, when a full backup is scheduled, the DMS 210 transmit a request to the host environment 205, such that the full backup script corresponding to the full backup is executed. Additionally, the request may cause the managed volume to be mounted in an empty state (e.g., as mounted volume 225) because of the backup being a full backup. For a subsequent incremental backup (e.g., a differential or incremental), the DMS 210 may transmit a request to the host environment 205 to cause the backup agent 220 to execute the corresponding script 230, such as a differential script or the incremental script. Execution of the script may cause the corresponding data to be written to the mounted volume 225. After completion of execution of the script, the DMS 210 may generate a snapshot of the mounted volume 225 and store the snapshot in accordance with the retention period of the SLA.

Figure 3:
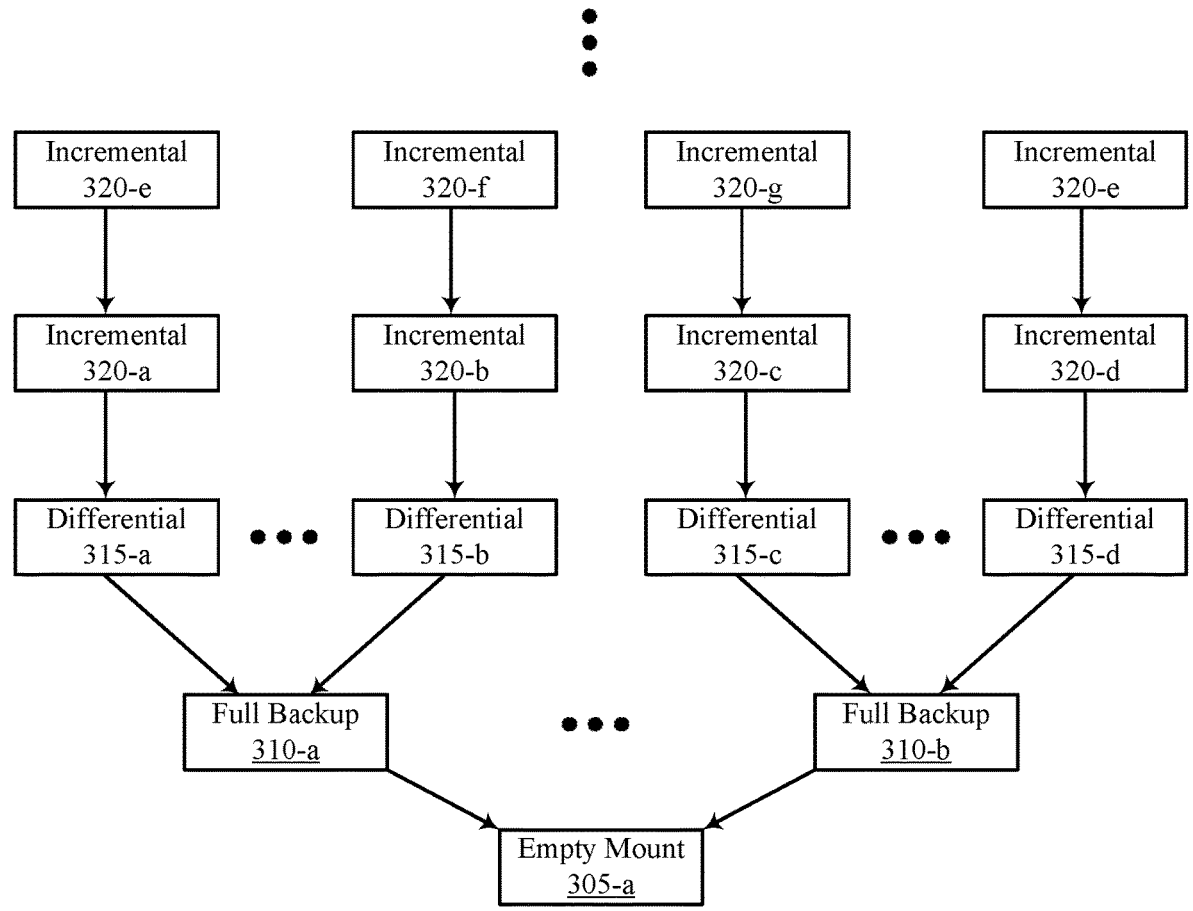
FIG. 3 illustrates an example of a backup chain that supports snappable recovery chain over generic managed volume in accordance with aspects of the present disclosure.

FIG. 3 illustrates an example of a backup chain 300 that supports snappable recovery chain over generic managed volume in accordance with aspects of the present disclosure. The backup chain 300 may be implemented by a DMS, such as a DMS 110 of FIG. 1 and a DMS 210 of FIG. 1. The backup chain 300 may also be implemented for a remote host, such as a host environment 205 of FIG. 2 or a computing device 105 of FIG. 1. For example, the backup chain 300 may be generated by a DMS and may correspond to a backup of a remote host as described herein. The DMS may implement or generate the backup chain in accordance with a backup schedule or a SLA.

For example, a SLA or backup schedule may specify that a full snapshot is to be taken every week, a differential snapshot is to be taken every day, and an incremental snapshot is to be taken every 12 hours. This schedule may result in the backup chain 300. Each full backup 310 is generated using an empty mount 305, as described herein. More particularly, for each full backup 310, the DMS may transmit a request for the full backup of a host data store (e.g., the data store 215 of FIG. 2). The request may cause a resource volume (e.g., managed volume) to be mounted in an empty state to the host environment. For example, the request may cause a backup agent executing on the host environment to mount the resource volume (e.g., a client path for the resource volume) to the host environment. The request may indicate or request that a script corresponding to the full backup procedure be executed on the host environment. The script may cause the data of the data store be written to the empty resource volume. When the full backup is complete (e.g., the data of the data store is written to the empty resource volume), the DMS may generate a snapshot of the resource volume. Thus, the first full backup 310-a may correspond to the backup snapshot for the full backup performed for a first week, and the second full backup 310-b correspond to the backup snapshot for the full backup performed for a second week.

After the full backup, the DMS may perform a differential backup 315, which is an example of an incremental backup that is performed using a previous full backup. The differential backup 315-a may be performed on week one, day one, in accordance with the backup schedule or SLA. For example, for the differential backup 315-a, the DMS may transmit a request to the host environment, and the request may cause the resource volume corresponding to the previous full backup 310-a be mounted to the host environment. Additionally, the request may cause execution of a script corresponding to the differential backup be executed. The differential script may be configured to write differences between the full backup (e.g., the resource volume corresponding to the full backup) and the current state of the data store to the resource volume. After completion of the differential backup 315-a, the DMS may generate a snapshot of the resource volume.

Subsequently, the DMS may perform an incremental backup 320-a, which may be performed on day 1, week 1, 12 hours. For example, the DMS may transmit a request to the host environment, and the request may cause the resource volume corresponding to the previous differential backup 315-a to be mounted to the host environment. Additionally, the request may cause execution of a script corresponding to the incremental backup to be executed. The incremental script may be configured to write differences between the differential backup 315-a and the current state of the data to the resource volume. After completion of the incremental backup (e.g., the changed data is written), the DMS may generate a snapshot of the resource volume. The DMS may subsequently perform an incremental backup 320-e, as well as subsequent full backup 310-b, subsequent differential backups 315, and subsequent incremental backups 320. Each set of backups from one of the full backups 310 to a corresponding incremental backup 320 may be an example of a chain of backups.

Thus, for a restore process, a user may select a point in time (e.g., a timestamp) such as to restore the host to the state corresponding to that point in time. The DMS may compute or identify a snapshot to the selected point in time, and expose the mount (e.g., resource volume) with the relevant chain of snapshots. For the restore process, a restore script may be executed when an export job is created to trigger the restore or database cloning operation, which may include reading from the exposed snapshot export. Additionally, using these techniques, a snapshot view may be annotated to indicate whether they are full, incremental, or differential backups. Further, with using full and incremental backups, which involves adding data rather than deleting data, storage reporting may be accurate and easier regarding logical and physical space.

Accordingly, the techniques described herein support different types of backups like full, incremental, and differential over resource volumes (e.g., NFS shares). Further, the empty mounting of the resource volume for each full backup may limit the need of space management on the mount point and limit data clean up by host environment scripts. Moreover, expiration of data or backups as part of the backup schedule (e.g., SLA) reduces processing overhead. Further, data deletions and heavy I/O maintenance operations, such as reverse and consolidate operations are reduced, which also which reduces processing overhead. Further, the techniques described here support improved user experience, as users select a snapshot or timestamp for restoration, and the DMS is configured to identify the related snapshots used for restoring.

Figure 4:
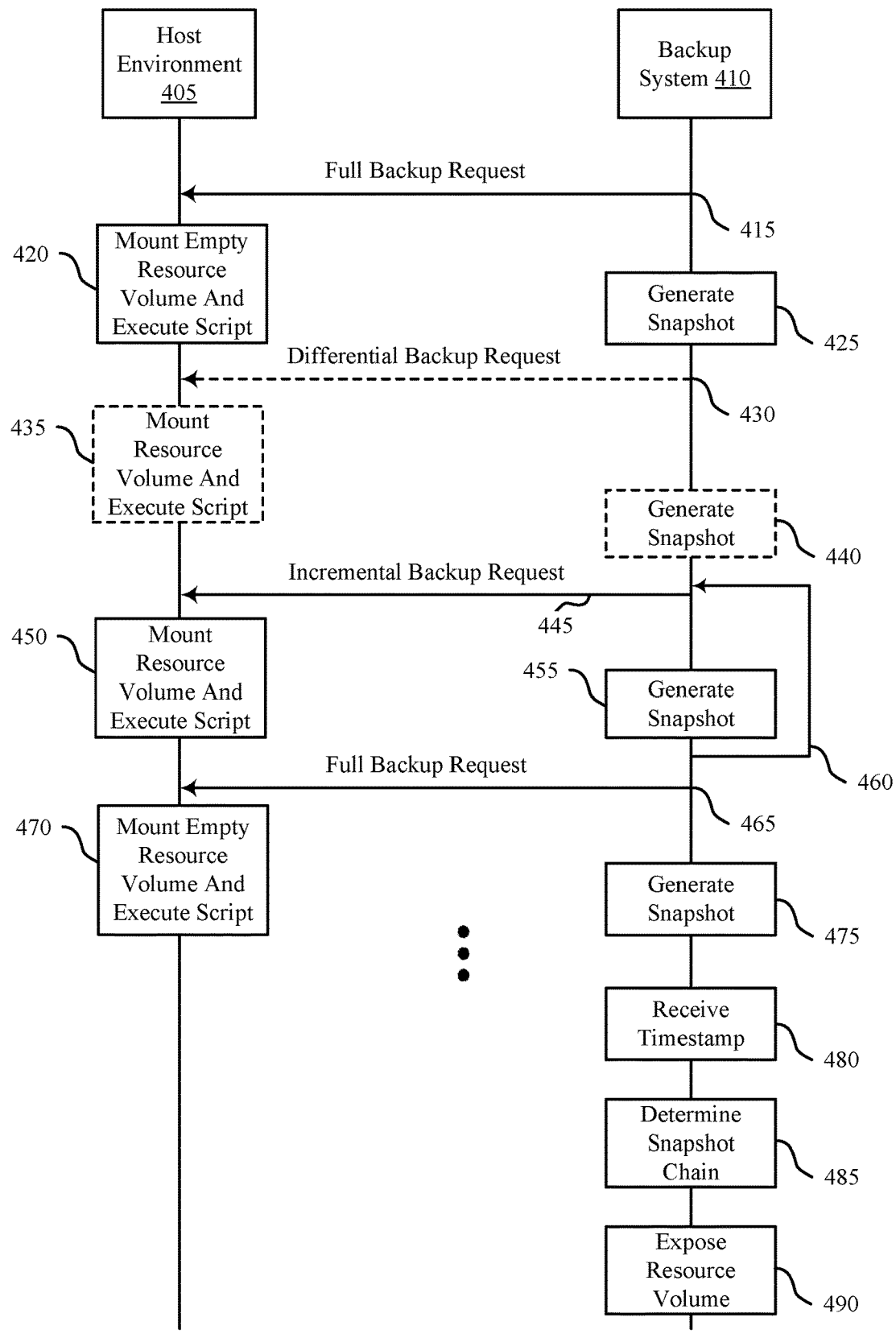
FIG. 4 illustrates an example of a process flow that supports snappable recovery chain over generic managed volume in accordance with aspects of the present disclosure.

FIG. 4 illustrates an example of a process flow 400 that supports snappable recovery chain over generic managed volume in accordance with aspects of the present disclosure. The process flow 400 includes a host environment 405 and a backup system 410, which may be examples of the corresponding devices as described with respect to FIGS. 1 through 3. For example, the backup system 410 may be an example of a DMS as described herein. In the following description of the process flow 400, the operations between the host environment 405 and the backup system 410 may be transmitted in a different order than the example order shown, or the operations performed may be performed in different orders or at different times. Some operations may also be omitted from the process flow 400, and other operations may be added to the process flow 400.

At 415, the backup system 410 may transmit, to the host environment 405 according to a backup schedule for the host environment 405, a first request for a full backup of a host data store of the host environment. At 420, the request may cause the host environment 405 (e.g., a backup agent of the host environment 405) to mount a resource volume in an empty state on the host environment. For example, the request may include a client path corresponding to the empty resource volume, such as to cause the host environment 405 to mount the resource volume. Additionally, at 420, the request may cause the host environment 405 to execute a full backup script, which writes the data of the data store of the host environment to the empty resource volume. In some examples, the request indicates the script that the host environment is to execute, which, in this case, is the full backup script.

At 425, the backup system 410 may generate, in response to completion of the full backup of the host data to the resource volume, a first snapshot of the resource volume.

At 430, the backup system 410 may transmit, to the host environment 405 according to the backup schedule, a second request for a differential backup of the host data store. At 435, the second request results in mounting of the resource volume in a first state corresponding to the first snapshot to the host environment 405. For example, the request may include a client path corresponding to the resource volume that includes data corresponding to the first snapshot such as to cause the host environment 405 to mount the resource volume. Additionally, at 435, the request may cause the host environment 405 to execute a differential backup script, which writes differences in the data of the data store of the host environment and the resource volume to the resource volume. In some examples, the request indicates the script that the host environment is to execute, which, in this case, is the differential backup script.

At 440, the backup system 410 may generate in response to completion of the differential backup of the host data store, a second snapshot of the resource volume. The first snapshot and the second snapshot are configured to restore the host data store to a state corresponding to the differential backup.

At 445, the backup system 410 may transmit, to the host environment 405 and according to the backup schedule, a third request for an incremental backup of the host data store. At 450, the third request results in mounting of the resource volume in a second state corresponding to the second snapshot. For example, the request may include a client path corresponding to the resource volume that includes data corresponding to the second snapshot such as to cause the host environment 405 to mount the resource volume. Additionally, at 435, the request may cause the host environment 405 to execute an incremental backup script, which writes in the data of the data store of the host environment and the resource volume to the resource volume. In some examples, the request indicates the script that the host environment is to execute, which, in this case, is the incremental backup script.

At 455, the backup system 410 may generate, in response to completion of the incremental backup of the host data store, a third snapshot of the resource volume, wherein the first snapshot, the second snapshot, and the third snapshot are configured to restore the host data store to a state corresponding to the incremental backup.

At 460, the backup system 410 may repeat incremental backup requests at 445 and snapshot generation at 455 based on the backup schedule. The full backup, differential backup, and one or more incremental backups may result in a first chain of backups starting with the full backup corresponding to the first request to an incremental backup.

At 465, the backup system 410 may transmit, to the host environment 405 according to a backup schedule, a fourth request for the full backup of the host data store. At 470, the fourth request results in mounting of the resource volume in the empty state on the host environment instead of mounting the resource volume corresponding to the first snapshot, second snapshot, and third snapshot. At 475, the backup system 410 may generate, in response to completion of the full backup of the host data store to the resource volume, a third snapshot of the resource volume.

Subsequently, in response to a host failure or based on some other condition, the backup system 410 may receive, at 480, via a user interface associated with the backup system 410, a timestamp for restoring the host data store to a state corresponding to the timestamp. At 485, the backup system 410 may determine, using the timestamp, a snapshot of a chain of snapshots associated with the host data store. The chain of snapshots includes the full backup and one or more incremental backups. At 490, the backup system 410 may expose, for restoring the host data store, the resource volume in a state corresponding to the determined snapshot.

Figure 5:
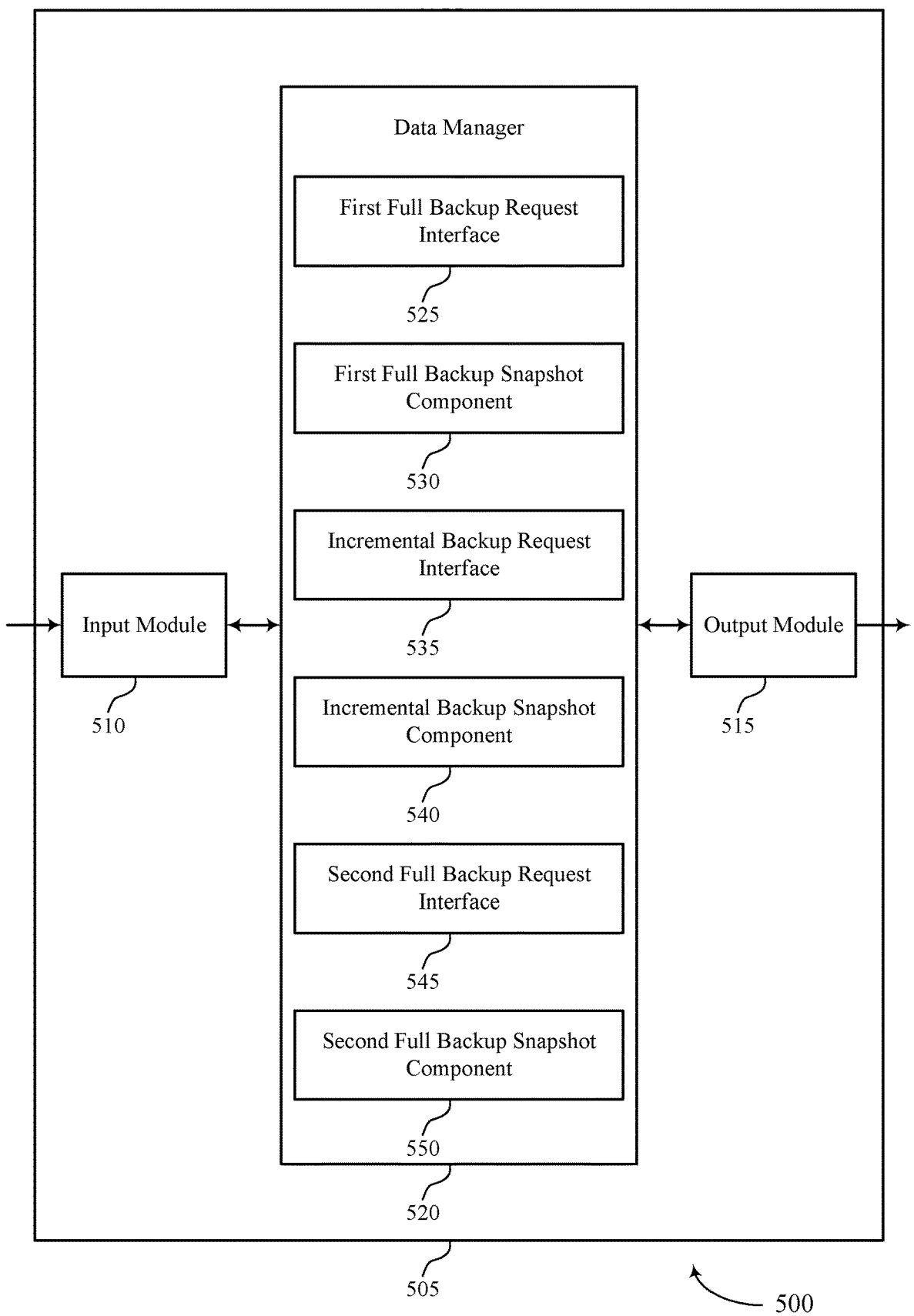
FIG. 5 illustrates a block diagram of an apparatus that supports snappable recovery chain over generic managed volume in accordance with aspects of the present disclosure.

FIG. 5 illustrates a block diagram 500 of a system 505 that supports snappable recovery chain over generic managed volume in accordance with aspects of the present disclosure. In some examples, the system 505 may be an example of aspects of one or more components described with reference to FIG. 1, such as a DMS 110. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. In some cases, the input interface 510 may send signaling corresponding to (e.g., representative of or otherwise based on) such input signaling to other components of the system 505 for processing. The input interface 510 may send aspects of these input signals to other components of the system 505 for processing. For example, the input interface 510 may transmit such corresponding signaling to the data manager 520 to support snappable recovery chain over generic managed volume. In some cases, the input interface 510 may be a component of an network interface 715 as described with reference to FIG. 7.

The output interface 515 may manage output signaling for the system 505. For example, the output interface 515 may receive signaling from other components of the system 505, such as the data manager 520, and may transmit signaling corresponding to (e.g., representative of or otherwise based on) such signaling to other systems or devices. In some examples, the output interface 515 may be a component of an network interface 715 as described with reference to FIG. 7.

The data manager 520 may include a first full backup request interface 525, a first full backup snapshot component 530, an incremental backup request interface 535, an incremental backup snapshot component 540, a second full backup request interface 545, a second full backup snapshot component 550, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The first full backup request interface 525 may be configured as or otherwise support a means for transmitting, from a backup system to a host environment according to a backup schedule for the host environment, a first request for a full backup of a host data store of the host environment, where the first request results in mounting of a resource volume in an empty state on the host environment. The first full backup snapshot component 530 may be configured as or otherwise support a means for generating, in response to completion of the full backup of the host data to the resource volume, a first snapshot of the resource volume. The incremental backup request interface 535 may be configured as or otherwise support a means for transmitting, from the backup system to the host environment and according to the backup schedule, a second request for an incremental backup of the host data store, where the second request results in mounting of the resource volume in a first state corresponding to the first snapshot. The incremental backup snapshot component 540 may be configured as or otherwise support a means for generating, in response to completion of the incremental backup of the host data store, a second snapshot of the resource volume, where the first snapshot and the second snapshot are configured to restore the host data store to a state corresponding to the incremental backup. The second full backup request interface 545 may be configured as or otherwise support a means for transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot. The second full backup snapshot component 550 may be configured as or otherwise support a means for generating, in response to completion of the full backup of the host data store to the resource volume, a third snapshot of the resource volume.

Figure 6:
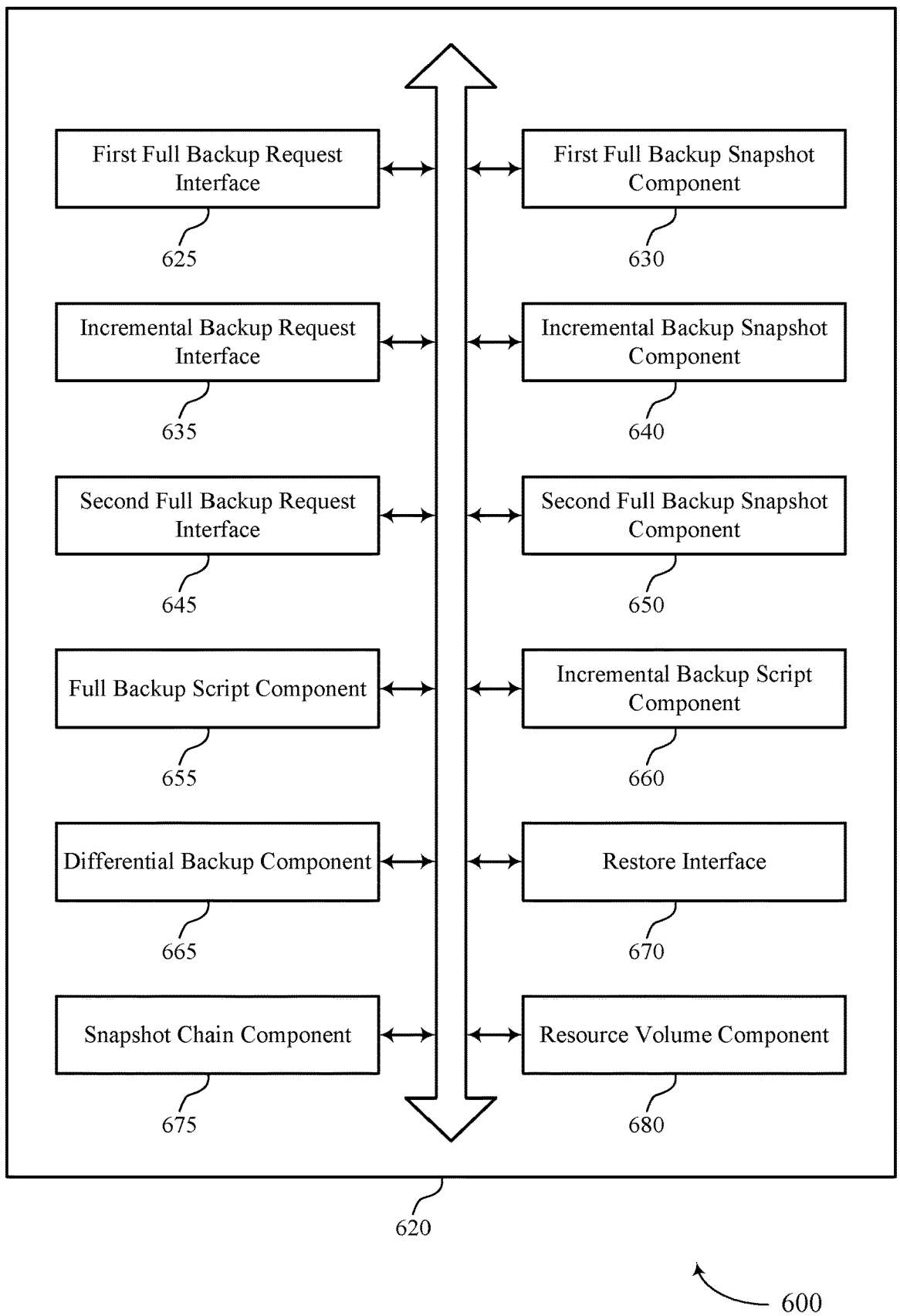
FIG. 6 illustrates a block diagram of a data manager that supports snappable recovery chain over generic managed volume in accordance with aspects of the present disclosure.

FIG. 6 illustrates a block diagram 600 of a data manager 620 that supports snappable recovery chain over generic managed volume in accordance with aspects of the present disclosure. The data manager 620 may be an example of aspects of a data manager or a data manager 520, or both, as described herein. The data manager 620, or various components thereof, may be an example of means for performing various aspects of snappable recovery chain over generic managed volume as described herein. For example, the data manager 620 may include a first full backup request interface 625, a first full backup snapshot component 630, an incremental backup request interface 635, an incremental backup snapshot component 640, a second full backup request interface 645, a second full backup snapshot component 650, a full backup script component 655, an incremental backup script component 660, a differential backup component 665, a restore interface 670, a snapshot chain component 675, a resource volume component 680, or any combination thereof. Each of these components may communicate, directly or indirectly, with one another (e.g., via one or more buses, communications links, communications interfaces, or any combination thereof).

The first full backup request interface 625 may be configured as or otherwise support a means for transmitting, from a backup system to a host environment according to a backup schedule for the host environment, a first request for a full backup of a host data store of the host environment, where the first request results in mounting of a resource volume in an empty state on the host environment. The first full backup snapshot component 630 may be configured as or otherwise support a means for generating, in response to completion of the full backup of the host data to the resource volume, a first snapshot of the resource volume. The incremental backup request interface 635 may be configured as or otherwise support a means for transmitting, from the backup system to the host environment and according to the backup schedule, a second request for an incremental backup of the host data store, where the second request results in mounting of the resource volume in a first state corresponding to the first snapshot. The incremental backup snapshot component 640 may be configured as or otherwise support a means for generating, in response to completion of the incremental backup of the host data store, a second snapshot of the resource volume, where the first snapshot and the second snapshot are configured to restore the host data store to a state corresponding to the incremental backup. The second full backup request interface 645 may be configured as or otherwise support a means for transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot. The second full backup snapshot component 650 may be configured as or otherwise support a means for generating, in response to completion of the full backup of the host data store to the resource volume, a third snapshot of the resource volume.

In some examples, to support transmitting the first request or transmitting the third request, the full backup script component 655 may be configured as or otherwise support a means for transmitting an indication of a full backup script that the host environment is to execute for performing the full backup of the host data store of the host environment, where the full backup script is one of a set of multiple backup scripts configured at the host environment.

In some examples, to support transmitting the second request, the incremental backup script component 660 may be configured as or otherwise support a means for transmitting an indication of an incremental backup script that the host environment is to execute for performing the incremental backup of the host data store of the host environment, where the incremental backup script is one of a set of multiple backup scripts configured at the host environment.

In some examples, to support transmitting the second request, the differential backup component 665 may be configured as or otherwise support a means for transmitting the second request for a differential backup, where the differential backup is configured to identify differences between data of the host data store corresponding to the full backup and data of the host data store at a time of the differential backup.

In some examples, the incremental backup request interface 635 may be configured as or otherwise support a means for transmitting, prior to the third request, a fourth request for a second incremental backup, where the second incremental backup is configured to identify differences between data of the host data store corresponding to the differential backup and the data of the host data store at a time of the fourth request.

In some examples, to support transmitting the second request, the differential backup component 665 may be configured as or otherwise support a means for transmitting an indication of a differential backup script that the host environment is to execute for performing the differential backup of the host data store of the host environment, where the differential backup script is one of a set of multiple backup scripts configured at the host environment.

In some examples, to support transmitting the second request, the incremental backup request interface 635 may be configured as or otherwise support a means for transmitting a set of multiple second requests for the incremental backup at respective times according to the backup schedule, where each respective second request results in a different incremental backup indicating a change in data of the host data store relative to the data of the host data store corresponding to a previous backup.

In some examples, the set of multiple second requests results in a first chain of backups starting with the full backup corresponding to the first request to an incremental backup corresponding to one of the second requests prior to the third request for the full backup. In some examples, the third request results in a second chain of backups.

In some examples, the restore interface 670 may be configured as or otherwise support a means for receiving, via a user interface, a timestamp for restoring the host data store to a state corresponding to the timestamp. In some examples, the snapshot chain component 675 may be configured as or otherwise support a means for determining, using the timestamp, a snapshot of a chain of snapshots associated with the host data store, where the chain of snapshots includes the full backup and a set of multiple incremental backups including a differential backup corresponding to the second request. In some examples, the resource volume component 680 may be configured as or otherwise support a means for exposing, for restoring the host data store, the resource volume in a state corresponding to the determined snapshot.

Figure 7:
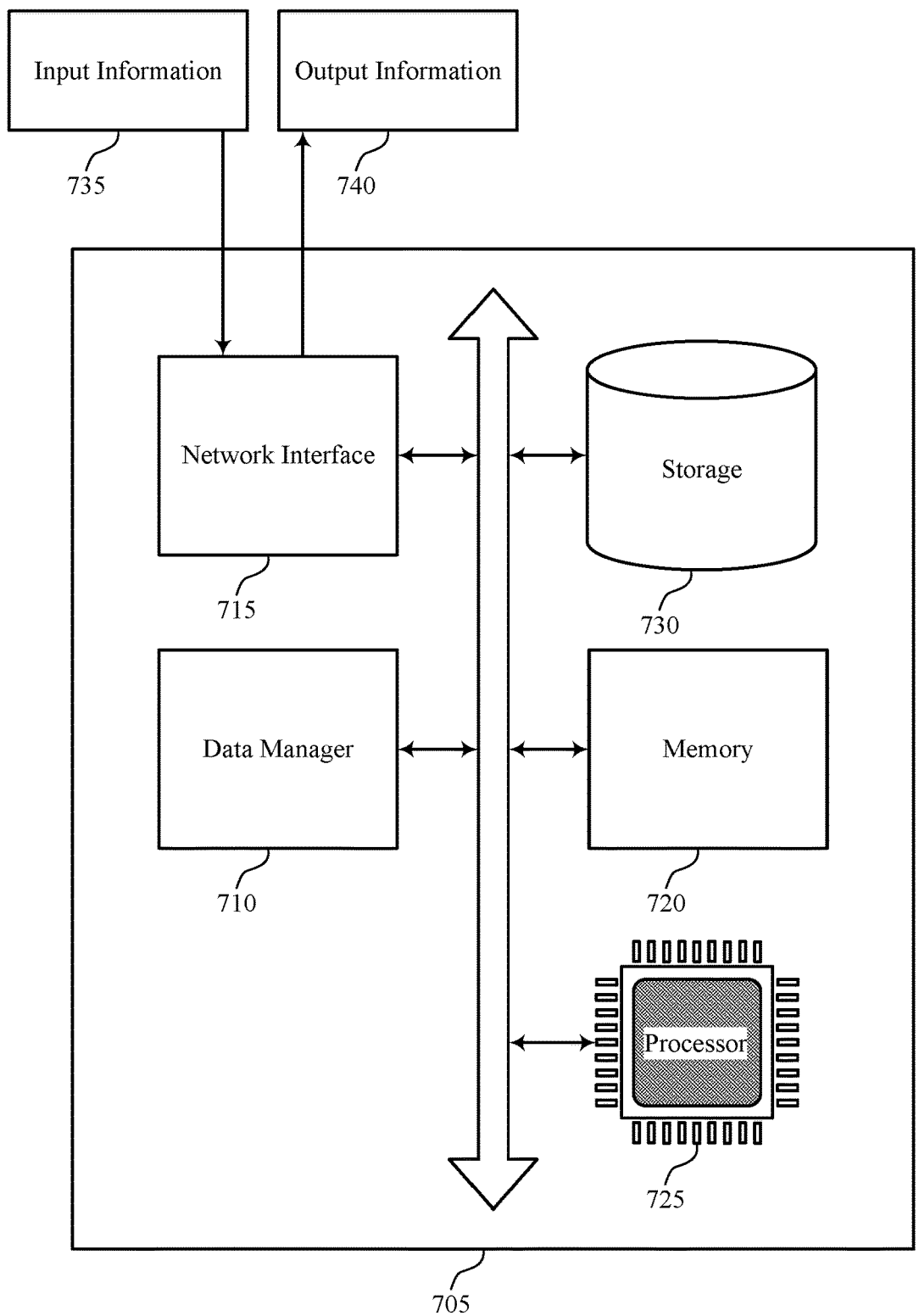
FIG. 7 illustrates a diagram of a system including a device that supports snappable recovery chain over generic managed volume in accordance with aspects of the present disclosure.

FIG. 7 illustrates a diagram 700 of a system 705 that supports snappable recovery chain over generic managed volume in accordance with aspects of the present disclosure. The system 705 may be an example of or include the components of a system 505 as described herein. The system 705 may include components for data management including components such as a data manager 710, an network interface 715, a memory 720, a processor 725, and storage 730. These components may be in electronic communication or otherwise coupled with each other (e.g., operatively, communicatively, functionally, electronically, electrically; via one or more buses, communications links, communications interfaces, or any combination thereof). Additionally, the components of the system 505 may comprise corresponding physical components or may be implemented as corresponding virtual components (e.g., components of one or more virtual machines). In some examples, the system 505 may be an example of aspects of one or more components described with reference to FIG. 1, such as a DMS 110.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165.

Memory 720 may include random-access memory RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application specific integrated circuit (ASIC), a field-programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting snappable recovery chain over generic managed volume. Though a single processor 725 is depicted in the example of FIG. 7, it is to be understood that the system 705 may include any quantity of one or more of processors 725 and that a group of processors 725 may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

For example, the data manager 710 may be configured as or otherwise support a means for transmitting, from a backup system to a host environment according to a backup schedule for the host environment, a first request for a full backup of a host data store of the host environment, where the first request results in mounting of a resource volume in an empty state on the host environment. The data manager 710 may be configured as or otherwise support a means for generating, in response to completion of the full backup of the host data to the resource volume, a first snapshot of the resource volume. The data manager 710 may be configured as or otherwise support a means for transmitting, from the backup system to the host environment and according to the backup schedule, a second request for an incremental backup of the host data store, where the second request results in mounting of the resource volume in a first state corresponding to the first snapshot. The data manager 710 may be configured as or otherwise support a means for generating, in response to completion of the incremental backup of the host data storing, a second snapshot of the resource volume, where the first snapshot and the second snapshot are configured to restore the host data store to a state corresponding to the incremental backup. The data manager 710 may be configured as or otherwise support a means for transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot. The data manager 710 may be configured as or otherwise support a means for generating, in response to completion of the full backup of the host data storing to the resource volume, a third snapshot of the resource volume.

By including or configuring the data manager 710 in accordance with examples as described herein, the system 705 may support techniques for reduced processing. For example, by using the backup managed volume techniques described herein, various heavy I/O operations may be reduced, such as reverse and consolidate operations at the DMS and cleanup operations at a host environment.

Figure 8:
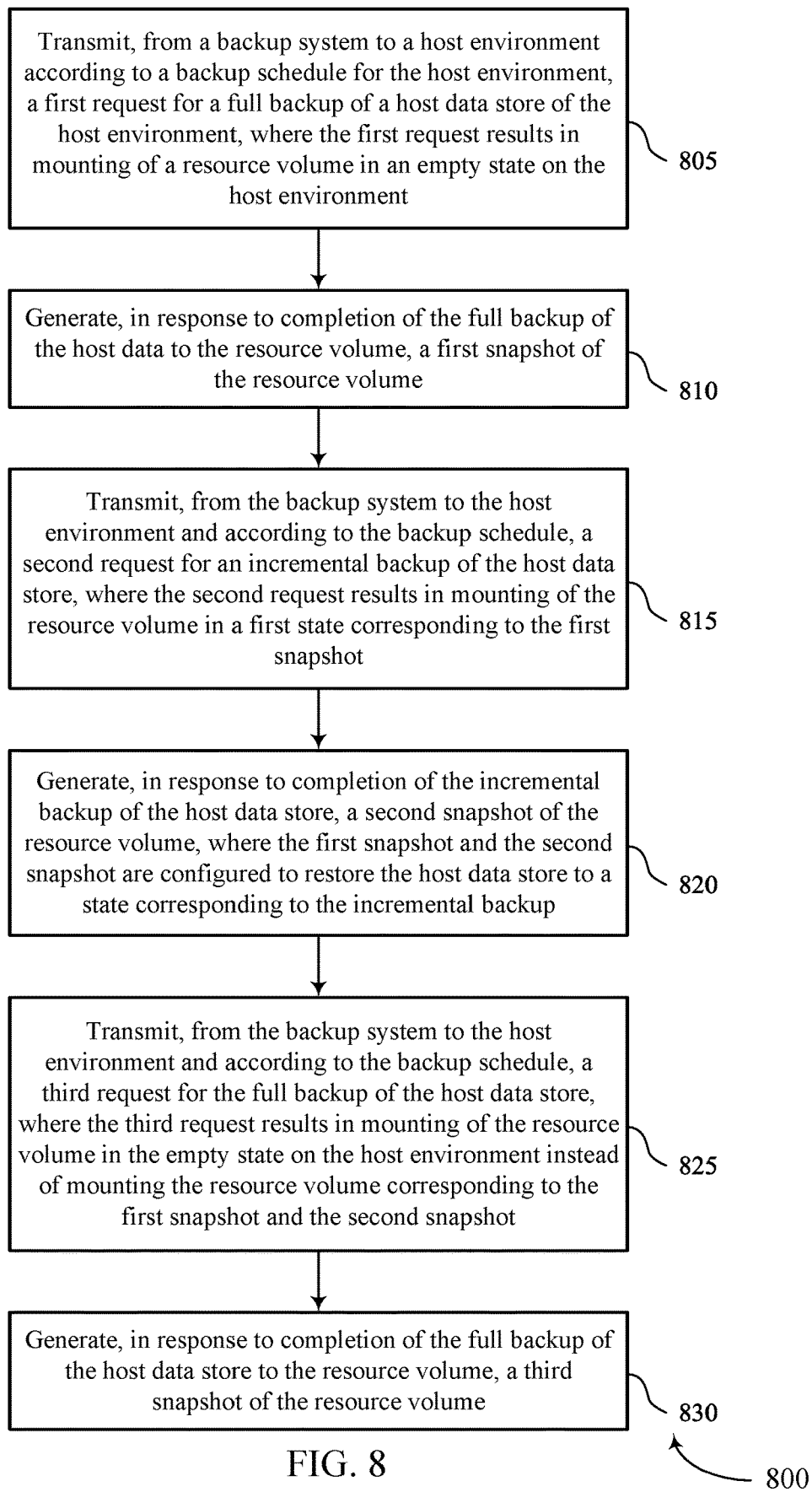
FIGS. 8 through 11 illustrate flowcharts showing methods that support snappable recovery chain over generic managed volume in accordance with aspects of the present disclosure.

FIG. 8 illustrates a flowchart showing a method 800 that supports snappable recovery chain over generic managed volume in accordance with aspects of the present disclosure. The operations of the method 800 may be implemented by a system or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include transmitting, from a backup system to a host environment according to a backup schedule for the host environment, a first request for a full backup of a host data store of the host environment, where the first request results in mounting of a resource volume in an empty state on the host environment. The operations of 805 may be performed in accordance with examples as disclosed herein. In some examples, aspects of the operations of 805 may be performed by a first full backup request interface 625 as described with reference to FIG. 6.

At 810, the method may include generating, in response to completion of the full backup of the host data to the resource volume, a first snapshot of the resource volume. The operations of 810 may be performed in accordance with examples as disclosed herein. In some examples, aspects of the operations of 810 may be performed by a first full backup snapshot component 630 as described with reference to FIG. 6.

At 815, the method may include transmitting, from the backup system to the host environment and according to the backup schedule, a second request for an incremental backup of the host data store, where the second request results in mounting of the resource volume in a first state corresponding to the first snapshot. The operations of 815 may be performed in accordance with examples as disclosed herein. In some examples, aspects of the operations of 815 may be performed by an incremental backup request interface 635 as described with reference to FIG. 6.

At 820, the method may include generating, in response to completion of the incremental backup of the host data store, a second snapshot of the resource volume, where the first snapshot and the second snapshot are configured to restore the host data store to a state corresponding to the incremental backup. The operations of 820 may be performed in accordance with examples as disclosed herein. In some examples, aspects of the operations of 820 may be performed by an incremental backup snapshot component 640 as described with reference to FIG. 6.

At 825, the method may include transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot. The operations of 825 may be performed in accordance with examples as disclosed herein. In some examples, aspects of the operations of 825 may be performed by a second full backup request interface 645 as described with reference to FIG. 6.

At 830, the method may include generating, in response to completion of the full backup of the host data store to the resource volume, a third snapshot of the resource volume. The operations of 830 may be performed in accordance with examples as disclosed herein. In some examples, aspects of the operations of 830 may be performed by a second full backup snapshot component 650 as described with reference to FIG. 6.

Figure 9:
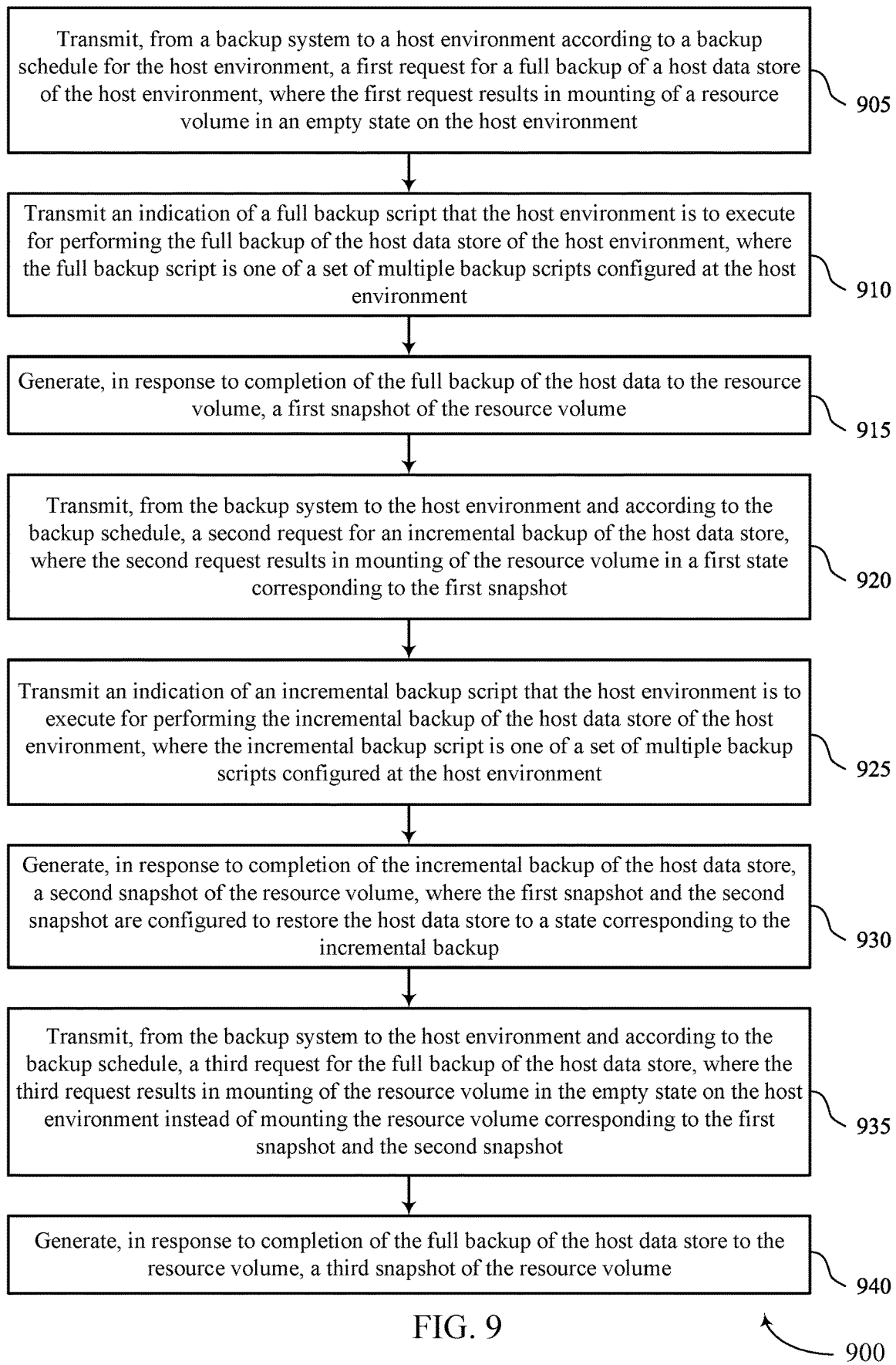

FIG. 9 illustrates a flowchart showing a method 900 that supports snappable recovery chain over generic managed volume in accordance with aspects of the present disclosure. The operations of the method 900 may be implemented by a system or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include transmitting, from a backup system to a host environment according to a backup schedule for the host environment, a first request for a full backup of a host data store of the host environment, where the first request results in mounting of a resource volume in an empty state on the host environment. The operations of 905 may be performed in accordance with examples as disclosed herein. In some examples, aspects of the operations of 905 may be performed by a first full backup request interface 625 as described with reference to FIG. 6.

At 910, the method may include transmitting an indication of a full backup script that the host environment is to execute for performing the full backup of the host data store of the host environment, where the full backup script is one of a set of multiple backup scripts configured at the host environment. The operations of 910 may be performed in accordance with examples as disclosed herein. In some examples, aspects of the operations of 910 may be performed by a full backup script component 655 as described with reference to FIG. 6.

At 915, the method may include generating, in response to completion of the full backup of the host data to the resource volume, a first snapshot of the resource volume. The operations of 915 may be performed in accordance with examples as disclosed herein. In some examples, aspects of the operations of 915 may be performed by a first full backup snapshot component 630 as described with reference to FIG. 6.

At 920, the method may include transmitting, from the backup system to the host environment and according to the backup schedule, a second request for an incremental backup of the host data store, where the second request results in mounting of the resource volume in a first state corresponding to the first snapshot. The operations of 920 may be performed in accordance with examples as disclosed herein. In some examples, aspects of the operations of 920 may be performed by an incremental backup request interface 635 as described with reference to FIG. 6.

At 925, the method may include transmitting an indication of an incremental backup script that the host environment is to execute for performing the incremental backup of the host data store of the host environment, where the incremental backup script is one of a set of multiple backup scripts configured at the host environment. The operations of 925 may be performed in accordance with examples as disclosed herein. In some examples, aspects of the operations of 925 may be performed by an incremental backup script component 660 as described with reference to FIG. 6.

At 930, the method may include generating, in response to completion of the incremental backup of the host data store, a second snapshot of the resource volume, where the first snapshot and the second snapshot are configured to restore the host data store to a state corresponding to the incremental backup. The operations of 930 may be performed in accordance with examples as disclosed herein. In some examples, aspects of the operations of 930 may be performed by an incremental backup snapshot component 640 as described with reference to FIG. 6.

At 935, the method may include transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot. The operations of 935 may be performed in accordance with examples as disclosed herein. In some examples, aspects of the operations of 935 may be performed by a second full backup request interface 645 as described with reference to FIG. 6.

At 940, the method may include generating, in response to completion of the full backup of the host data store to the resource volume, a third snapshot of the resource volume. The operations of 940 may be performed in accordance with examples as disclosed herein. In some examples, aspects of the operations of 940 may be performed by a second full backup snapshot component 650 as described with reference to FIG. 6.

Figure 10:
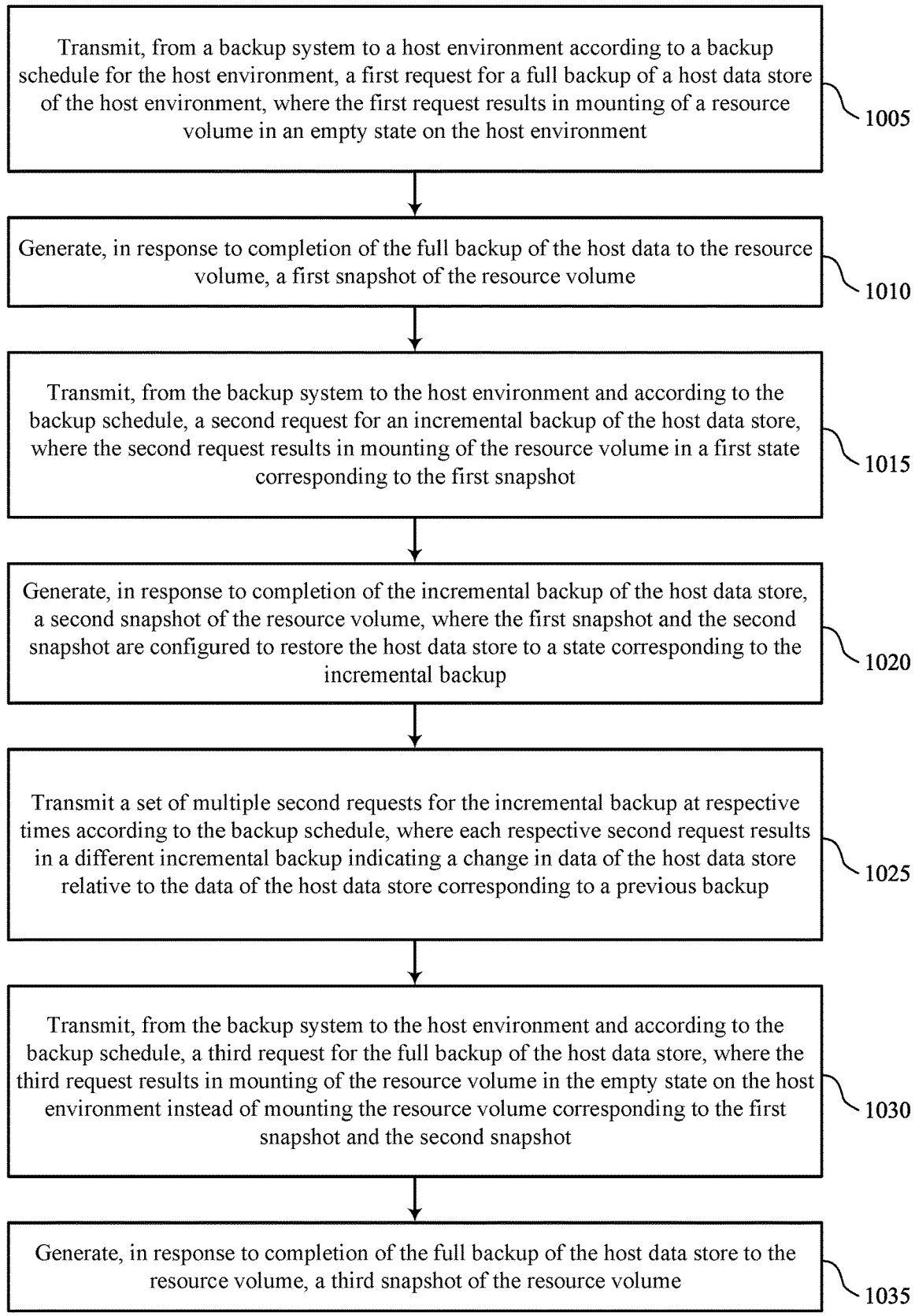

FIG. 10 illustrates a flowchart showing a method 1000 that supports snappable recovery chain over generic managed volume in accordance with aspects of the present disclosure. The operations of the method 1000 may be implemented by a system or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include transmitting, from a backup system to a host environment according to a backup schedule for the host environment, a first request for a full backup of a host data store of the host environment, where the first request results in mounting of a resource volume in an empty state on the host environment. The operations of 1005 may be performed in accordance with examples as disclosed herein. In some examples, aspects of the operations of 1005 may be performed by a first full backup request interface 625 as described with reference to FIG. 6.

At 1010, the method may include generating, in response to completion of the full backup of the host data to the resource volume, a first snapshot of the resource volume. The operations of 1010 may be performed in accordance with examples as disclosed herein. In some examples, aspects of the operations of 1010 may be performed by a first full backup snapshot component 630 as described with reference to FIG. 6.

At 1015, the method may include transmitting, from the backup system to the host environment and according to the backup schedule, a second request for an incremental backup of the host data store, where the second request results in mounting of the resource volume in a first state corresponding to the first snapshot. The operations of 1015 may be performed in accordance with examples as disclosed herein. In some examples, aspects of the operations of 1015 may be performed by an incremental backup request interface 635 as described with reference to FIG. 6.

At 1020, the method may include generating, in response to completion of the incremental backup of the host data store, a second snapshot of the resource volume, where the first snapshot and the second snapshot are configured to restore the host data store to a state corresponding to the incremental backup. The operations of 1020 may be performed in accordance with examples as disclosed herein. In some examples, aspects of the operations of 1020 may be performed by an incremental backup snapshot component 640 as described with reference to FIG. 6.

At 1025, the method may include transmitting a set of multiple second requests for the incremental backup at respective times according to the backup schedule, where each respective second request results in a different incremental backup indicating a change in data of the host data store relative to the data of the host data store corresponding to a previous backup. The operations of 1025 may be performed in accordance with examples as disclosed herein. In some examples, aspects of the operations of 1025 may be performed by an incremental backup request interface 635 as described with reference to FIG. 6.

At 1030, the method may include transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot. The operations of 1030 may be performed in accordance with examples as disclosed herein. In some examples, aspects of the operations of 1030 may be performed by a second full backup request interface 645 as described with reference to FIG. 6.

At 1035, the method may include generating, in response to completion of the full backup of the host data store to the resource volume, a third snapshot of the resource volume. The operations of 1035 may be performed in accordance with examples as disclosed herein. In some examples, aspects of the operations of 1035 may be performed by a second full backup snapshot component 650 as described with reference to FIG. 6.

Figure 11:
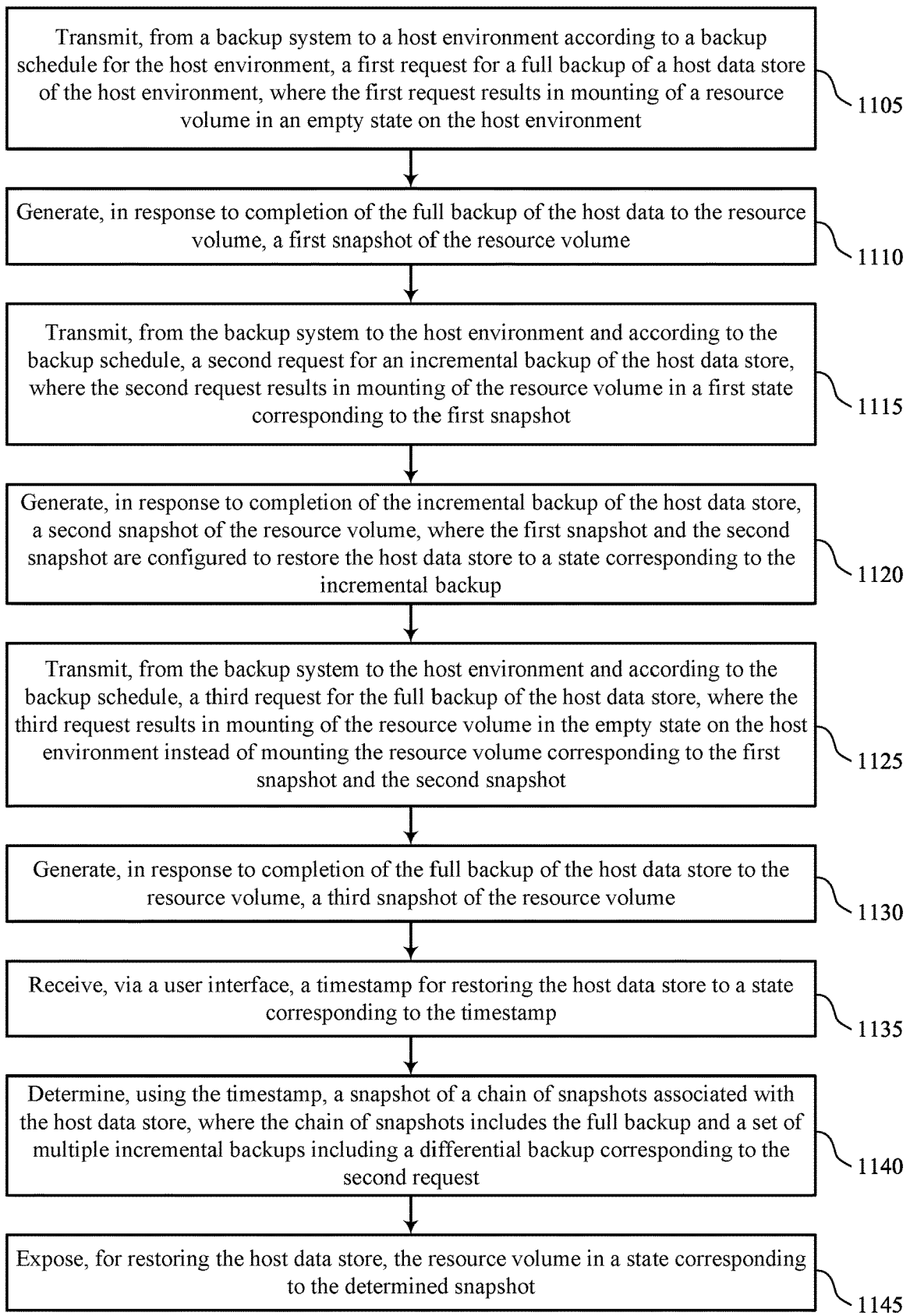

FIG. 11 illustrates a flowchart showing a method 1100 that supports snappable recovery chain over generic managed volume in accordance with aspects of the present disclosure. The operations of the method 1100 may be implemented by a system or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include transmitting, from a backup system to a host environment according to a backup schedule for the host environment, a first request for a full backup of a host data store of the host environment, where the first request results in mounting of a resource volume in an empty state on the host environment. The operations of 1105 may be performed in accordance with examples as disclosed herein. In some examples, aspects of the operations of 1105 may be performed by a first full backup request interface 625 as described with reference to FIG. 6.

At 1110, the method may include generating, in response to completion of the full backup of the host data to the resource volume, a first snapshot of the resource volume. The operations of 1110 may be performed in accordance with examples as disclosed herein. In some examples, aspects of the operations of 1110 may be performed by a first full backup snapshot component 630 as described with reference to FIG. 6.

At 1115, the method may include transmitting, from the backup system to the host environment and according to the backup schedule, a second request for an incremental backup of the host data store, where the second request results in mounting of the resource volume in a first state corresponding to the first snapshot. The operations of 1115 may be performed in accordance with examples as disclosed herein. In some examples, aspects of the operations of 1115 may be performed by an incremental backup request interface 635 as described with reference to FIG. 6.

At 1120, the method may include generating, in response to completion of the incremental backup of the host data store, a second snapshot of the resource volume, where the first snapshot and the second snapshot are configured to restore the host data store to a state corresponding to the incremental backup. The operations of 1120 may be performed in accordance with examples as disclosed herein. In some examples, aspects of the operations of 1120 may be performed by an incremental backup snapshot component 640 as described with reference to FIG. 6.

At 1125, the method may include transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot. The operations of 1125 may be performed in accordance with examples as disclosed herein. In some examples, aspects of the operations of 1125 may be performed by a second full backup request interface 645 as described with reference to FIG. 6.

At 1130, the method may include generating, in response to completion of the full backup of the host data store to the resource volume, a third snapshot of the resource volume. The operations of 1130 may be performed in accordance with examples as disclosed herein. In some examples, aspects of the operations of 1130 may be performed by a second full backup snapshot component 650 as described with reference to FIG. 6.

At 1135, the method may include receiving, via a user interface, a timestamp for restoring the host data store to a state corresponding to the timestamp. The operations of 1135 may be performed in accordance with examples as disclosed herein. In some examples, aspects of the operations of 1135 may be performed by a restore interface 670 as described with reference to FIG. 6.

At 1140, the method may include determining, using the timestamp, a snapshot of a chain of snapshots associated with the host data store, where the chain of snapshots includes the full backup and a set of multiple incremental backups including a differential backup corresponding to the second request. The operations of 1140 may be performed in accordance with examples as disclosed herein. In some examples, aspects of the operations of 1140 may be performed by a snapshot chain component 675 as described with reference to FIG. 6.

At 1145, the method may include exposing, for restoring the host data store, the resource volume in a state corresponding to the determined snapshot. The operations of 1145 may be performed in accordance with examples as disclosed herein. In some examples, aspects of the operations of 1145 may be performed by a resource volume component 680 as described with reference to FIG. 6.

A method is described. The method may include transmitting, from a backup system to a host environment according to a backup schedule for the host environment, a first request for a full backup of a host data store of the host environment, where the first request results in mounting of a resource volume in an empty state on the host environment, generating, in response to completion of the full backup of the host data to the resource volume, a first snapshot of the resource volume, transmitting, from the backup system to the host environment and according to the backup schedule, a second request for an incremental backup of the host data store, where the second request results in mounting of the resource volume in a first state corresponding to the first snapshot, generating, in response to completion of the incremental backup of the host data store, a second snapshot of the resource volume, where the first snapshot and the second snapshot are configured to restore the host data store to a state corresponding to the incremental backup, transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot, and generating, in response to completion of the full backup of the host data store to the resource volume, a third snapshot of the resource volume.

An apparatus is described. The apparatus may include a processor, memory coupled with the processor, and instructions stored in the memory. The instructions may be executable by the processor to cause the apparatus to transmit, from a backup system to a host environment according to a backup schedule for the host environment, a first request for a full backup of a host data store of the host environment, where the first request results in mounting of a resource volume in an empty state on the host environment, generating, in response to completion of the full backup of the host data to the resource volume, a first snapshot of the resource volume, transmit, from the backup system to the host environment and according to the backup schedule, a second request for an incremental backup of the host data store, where the second request results in mounting of the resource volume in a first state corresponding to the first snapshot, generating, in response to completion of the incremental backup of the host data store, a second snapshot of the resource volume, where the first snapshot and the second snapshot are configured to restore the host data store to a state corresponding to the incremental backup, transmit, from the backup system to the host environment and according to the backup schedule, a third request for the full backup of the host data store, where the third request results in mounting of the resource volume in the empty state on the host environment instead of mounting the resource volume corresponding to the first snapshot and the second snapshot, and generating, in response to completion of the full backup of the host data store to the resource volume, a third snapshot of the resource volume.

Another apparatus is described. The apparatus may include means for transmitting, from a backup system to a host environment according to a backup schedule for the host environment, a first request for a full backup of a host data store of the host environment, where the first request results in mounting of a resource volume in an empty state on the host environment, means for generating, in response to completion of the full backup of the host data to the resource volume, a first snapshot of the resource volume, means for transmitting, from the backup system to the host environment and according to the backup schedule, a second request for an incremental backup of the host data store, where the second request results in mounting of the resource volume in a first state corresponding to the first snapshot, means for generating, in response to completion of the incremental backup of the host data store, a second snapshot of the resource volume, where the first snapshot and the second snapshot are configured to restore the host data store to a state corresponding to the incremental backup, means for transmitting, from the backup system to the host environment and according to the backup schedule, a third request for the full backup of the host data store, where the third request results in mounting of the resource volume in the empty state on the host environment instead of mounting the resource volume corresponding to the first snapshot and the second snapshot, and means for generating, in response to completion of the full backup of the host data store to the resource volume, a third snapshot of the resource volume.

A non-transitory computer-readable medium storing code is described. The code may include instructions executable by a processor to transmit, from a backup system to a host environment according to a backup schedule for the host environment, a first request for a full backup of a host data store of the host environment, where the first request results in mounting of a resource volume in an empty state on the host environment, generating, in response to completion of the full backup of the host data to the resource volume, a first snapshot of the resource volume, transmit, from the backup system to the host environment and according to the backup schedule, a second request for an incremental backup of the host data store, where the second request results in mounting of the resource volume in a first state corresponding to the first snapshot, generating, in response to completion of the incremental backup of the host data store, a second snapshot of the resource volume, where the first snapshot and the second snapshot are configured to restore the host data store to a state corresponding to the incremental backup, transmit, from the backup system to the host environment and according to the backup schedule, a third request for the full backup of the host data store, where the third request results in mounting of the resource volume in the empty state on the host environment instead of mounting the resource volume corresponding to the first snapshot and the second snapshot, and generating, in response to completion of the full backup of the host data store to the resource volume, a third snapshot of the resource volume.

In some examples of the method, apparatuses, and non-transitory computer-readable medium described herein, transmitting the first request or transmitting the third request may include operations, features, means, or instructions for transmitting an indication of a full backup script that the host environment may be to execute for performing the full backup of the host data store of the host environment, where the full backup script may be one of a set of multiple backup scripts configured at the host environment.

In some examples of the method, apparatuses, and non-transitory computer-readable medium described herein, transmitting the second request may include operations, features, means, or instructions for transmitting an indication of an incremental backup script that the host environment may be to execute for performing the incremental backup of the host data store of the host environment, where the incremental backup script may be one of a set of multiple backup scripts configured at the host environment.

In some examples of the method, apparatuses, and non-transitory computer-readable medium described herein, the transmitting the second request may include operations, features, means, or instructions for transmitting the second request for a differential backup, where the differential backup may be configured to identify differences between data of the host data store corresponding to the full backup and data of the host data store at a time of the differential backup.

Some examples of the method, apparatuses, and non-transitory computer-readable medium described herein may further include operations, features, means, or instructions for transmitting, prior to the third request, a fourth request for a second incremental backup, where the second incremental backup may be configured to identify differences between data of the host data store corresponding to the differential backup and the data of the host data store at a time of the fourth request.

In some examples of the method, apparatuses, and non-transitory computer-readable medium described herein, transmitting the second request may include operations, features, means, or instructions for transmitting an indication of a differential backup script that the host environment may be to execute for performing the differential backup of the host data store of the host environment, where the differential backup script may be one of a set of multiple backup scripts configured at the host environment.

In some examples of the method, apparatuses, and non-transitory computer-readable medium described herein, transmitting the second request may include operations, features, means, or instructions for transmitting a set of multiple second requests for the incremental backup at respective times according to the backup schedule, where each respective second request results in a different incremental backup indicating a change in data of the host data store relative to the data of the host data store corresponding to a previous backup.

In some examples of the method, apparatuses, and non-transitory computer-readable medium described herein, the set of multiple second requests results in a first chain of backups starting with the full backup corresponding to the first request to an incremental backup corresponding to one of the second requests prior to the third request for the full backup and the third request results in a second chain of backups.

Some examples of the method, apparatuses, and non-transitory computer-readable medium described herein may further include operations, features, means, or instructions for receiving, via a user interface, a timestamp for restoring the host data store to a state corresponding to the timestamp, determining, using the timestamp, a snapshot of a chain of snapshots associated with the host data store, where the chain of snapshots includes the full backup and a set of multiple incremental backups including a differential backup corresponding to the second request, and exposing, for restoring the host data store, the resource volume in a state corresponding to the determined snapshot.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management comprising:
   transmitting, from a backup system to a host environment according to a backup schedule for the host environment, a first request for a full backup of a host data store of the host environment, wherein the first request results in mounting of a resource volume in an empty state on the host environment;
   generating, in response to completion of the full backup of the host data store to the resource volume, a first snapshot of the resource volume;
   transmitting, from the backup system to the host environment and according to the backup schedule, a second request for an incremental backup of the host data store, wherein the second request results in mounting of the resource volume in a first state corresponding to the first snapshot;
   generating, in response to completion of the incremental backup of the host data store, a second snapshot of the resource volume, wherein the first snapshot and the second snapshot are configured to restore the host data store to a state corresponding to the incremental backup;
   transmitting, from the backup system to the host environment and according to the backup schedule, a third request for the full backup of the host data store, wherein the third request results in mounting of the resource volume in the empty state on the host environment instead of mounting the resource volume corresponding to the first snapshot and the second snapshot; and
   generating, in response to completion of the full backup of the host data store to the resource volume, a third snapshot of the resource volume.

2. The method of claim 1, wherein transmitting the first request or transmitting the third request comprises:
   transmitting an indication of a full backup script that the host environment is to execute for performing the full backup of the host data store of the host environment, wherein the full backup script is one of a plurality of backup scripts configured at the host environment.

3. The method of claim 1, wherein transmitting the second request comprises:
   transmitting an indication of an incremental backup script that the host environment is to execute for performing the incremental backup of the host data store of the host environment, wherein the incremental backup script is one of a plurality of backup scripts configured at the host environment.

4. The method of claim 1, wherein the transmitting the second request comprises:
   transmitting the second request for a differential backup, wherein the differential backup is configured to identify differences between data of the host data store corresponding to the full backup and data of the host data store at a time of the differential backup.

5. The method of claim 4, further comprising:
   transmitting, prior to the third request, a fourth request for a second incremental backup, wherein the second incremental backup is configured to identify differences between data of the host data store corresponding to the differential backup and the data of the host data store at a time of the fourth request.

6. The method of claim 4, wherein transmitting the second request comprises:

transmitting an indication of a differential backup script that the host environment is to execute for performing the differential backup of the host data store of the host environment, wherein the differential backup script is one of a plurality of backup scripts configured at the host environment.

7. The method of claim 1, wherein transmitting the second request comprises:
transmitting a plurality of second requests for the incremental backup at respective times according to the backup schedule, wherein each respective second request results in a different incremental backup indicating a change in data of the host data store relative to the data of the host data store corresponding to a previous backup.

8. The method of claim 7, wherein:
the plurality of second requests results in a first chain of backups starting with the full backup corresponding to the first request to an incremental backup corresponding to one of the plurality of second requests prior to the third request for the full backup, and wherein the third request results in a second chain of backups.

9. The method of claim 1, further comprising:
receiving, via a user interface, a timestamp for restoring the host data store to a state corresponding to the timestamp;
determining, using the timestamp, a snapshot of a chain of snapshots associated with the host data store, wherein the chain of snapshots includes the full backup and a plurality of incremental backups including a differential backup corresponding to the second request; and
exposing, for restoring the host data store, the resource volume in a state corresponding to the determined snapshot.

10. An apparatus, comprising:
a processor;
memory coupled with the processor; and
instructions stored in the memory and executable by the processor to cause the apparatus to:
transmit, from a backup system to a host environment according to a backup schedule for the host environment, a first request for a full backup of a host data store of the host environment, wherein the first request results in mounting of a resource volume in an empty state on the host environment;
generate, in response to completion of the full backup of the host data store to the resource volume, a first snapshot of the resource volume;
transmit, from the backup system to the host environment and according to the backup schedule, a second request for an incremental backup of the host data store, wherein the second request results in mounting of the resource volume in a first state corresponding to the first snapshot;
generate, in response to completion of the incremental backup of the host data store, a second snapshot of the resource volume, wherein the first snapshot and the second snapshot are configured to restore the host data store to a state corresponding to the incremental backup;
transmit, from the backup system to the host environment and according to the backup schedule, a third request for the full backup of the host data store, wherein the third request results in mounting of the resource volume in the empty state on the host environment instead of mounting the resource volume corresponding to the first snapshot and the second snapshot; and
generate, in response to completion of the full backup of the host data store to the resource volume, a third snapshot of the resource volume.

11. The apparatus of claim 10, wherein the instructions to transmit the first request or transmitting the third request are executable by the processor to cause the apparatus to:
transmit an indication of a full backup script that the host environment is to execute for performing the full backup of the host data store of the host environment, wherein the full backup script is one of a plurality of backup scripts configured at the host environment.

12. The apparatus of claim 10, wherein the instructions to transmit the second request are executable by the processor to cause the apparatus to:
transmit an indication of an incremental backup script that the host environment is to execute for performing the incremental backup of the host data store of the host environment, wherein the incremental backup script is one of a plurality of backup scripts configured at the host environment.

13. The apparatus of claim 10, wherein the instructions to transmit the second request are executable by the processor to cause the apparatus to:
transmit the second request for a differential backup, wherein the differential backup is configured to identify differences between data of the host data store corresponding to the full backup and data of the host data store at a time of the differential backup.

14. The apparatus of claim 13, wherein the instructions are further executable by the processor to cause the apparatus to:
transmit, prior to the third request, a fourth request for a second incremental backup, wherein the second incremental backup is configured to identify differences between data of the host data store corresponding to the differential backup and the data of the host data store at a time of the fourth request.

15. The apparatus of claim 13, wherein the instructions to transmit the second request are executable by the processor to cause the apparatus to:
transmit an indication of a differential backup script that the host environment is to execute for performing the differential backup of the host data store of the host environment, wherein the differential backup script is one of a plurality of backup scripts configured at the host environment.

16. The apparatus of claim 10, wherein the instructions to transmit the second request are executable by the processor to cause the apparatus to:
transmit a plurality of second requests for the incremental backup at respective times according to the backup schedule, wherein each respective second request results in a different incremental backup indicating a change in data of the host data store relative to the data of the host data store corresponding to a previous backup.

17. The apparatus of claim 16, wherein:
the plurality of second requests results in a first chain of backups starting with the full backup corresponding to the first request to an incremental backup corresponding to one of the plurality of second requests prior to the third request for the full backup, and wherein the third request results in a second chain of backups.

18. The apparatus of claim 10, wherein the instructions are further executable by the processor to cause the apparatus to:
- receive, via a user interface, a timestamp for restoring the host data store to a state corresponding to the timestamp;
- determine, using the timestamp, a snapshot of a chain of snapshots associated with the host data store, wherein the chain of snapshots includes the full backup and a plurality of incremental backups including a differential backup corresponding to the second request; and
- expose, for restoring the host data store, the resource volume in a state corresponding to the determined snapshot.

19. A non-transitory computer-readable medium storing code, the code comprising instructions executable by a processor to:
- transmit, from a backup system to a host environment according to a backup schedule for the host environment, a first request for a full backup of a host data store of the host environment, wherein the first request results in mounting of a resource volume in an empty state on the host environment;
- generate, in response to completion of the full backup of the host data store to the resource volume, a first snapshot of the resource volume;
- transmit, from the backup system to the host environment and according to the backup schedule, a second request for an incremental backup of the host data store, wherein the second request results in mounting of the resource volume in a first state corresponding to the first snapshot;
- generate, in response to completion of the incremental backup of the host data store, a second snapshot of the resource volume, wherein the first snapshot and the second snapshot are configured to restore the host data store to a state corresponding to the incremental backup;
- transmit, from the backup system to the host environment and according to the backup schedule, a third request for the full backup of the host data store, wherein the third request results in mounting of the resource volume in the empty state on the host environment instead of mounting the resource volume corresponding to the first snapshot and the second snapshot; and
- generate, in response to completion of the full backup of the host data store to the resource volume, a third snapshot of the resource volume.

20. The non-transitory computer-readable medium of claim 19, wherein the instructions to transmit the first request or transmitting the third request are executable by the processor to:
- transmit an indication of a full backup script that the host environment is to execute for performing the full backup of the host data store of the host environment, wherein the full backup script is one of a plurality of backup scripts configured at the host environment.

\* \* \* \* \*